(12) United States Patent
Niizuma et al.

(10) Patent No.: US 10,454,319 B2
(45) Date of Patent: Oct. 22, 2019

(54) SYSTEM, METHOD, AND PROGRAM FOR MANAGING POWER TRANSMISSION DEVICE

(71) Applicant: IHI CORPORATION, Tokyo (JP)

(72) Inventors: Motonao Niizuma, Tokyo (JP); Susumu Tokura, Tokyo (JP); Eiichi Urushibata, Tokyo (JP); Hideo Naganuma, Tokyo (JP); Jun Araki, Tokyo (JP)

(73) Assignee: IHI CORPORATION, Tokyo (JP)

(*) Notice: Subject to any disclaimer, the term of this patent is extended or adjusted under 35 U.S.C. 154(b) by 182 days.

(21) Appl. No.: 15/697,980

(22) Filed: Sep. 7, 2017

(65) Prior Publication Data

US 2017/0373544 A1 Dec. 28, 2017

Related U.S. Application Data

(63) Continuation of application No. PCT/JP2016/064309, filed on May 13, 2016.

(30) Foreign Application Priority Data

May 25, 2015 (JP) ................................ 2015-105345

(51) Int. Cl.
*H02J 7/00* (2006.01)
*B60L 11/18* (2006.01)
(Continued)

(52) U.S. Cl.
CPC ............. *H02J 50/80* (2016.02); *B60L 50/50* (2019.02); *B60L 53/30* (2019.02); *B60L 53/63* (2019.02);
(Continued)

(58) Field of Classification Search
CPC ........ B60L 53/64; B60L 53/665; B60L 53/30; B60L 53/63; H02J 7/0027; H02J 7/027;
(Continued)

(56) References Cited

U.S. PATENT DOCUMENTS 8,347,120 B2* 1/2013 Zommer ............... G06F 1/3203
713/300
9,899,147 B2* 2/2018 Leem ..................... H02J 50/10
(Continued)

FOREIGN PATENT DOCUMENTS

EP 2592762 A1 5/2013
EP 2985870 A1 3/2014
(Continued)

OTHER PUBLICATIONS

International Search Report issued in corresponding International Patent Application No. PCT/JP2016/064309 dated Aug. 2, 2016, consisting of 5 pp. (English Translation Provided).
(Continued)

*Primary Examiner* — Dinh T Le
(74) *Attorney, Agent, or Firm* — Volpe and Koenig, P.C.

(57) ABSTRACT

According to an embodiment, a management system manages a power transmitter capable of wirelessly transmitting power to a power receiver of a movable object. The management system includes a detection unit configured to detect a state of the power transmitter, a storage unit configured to store a relationship between the state of the power transmitter and a power transmission level indicating possibility of power transmission of the power transmitter, an identification unit configured to identify the power transmission level corresponding to the state detected by the detection unit, and an output unit configured to output the identified power transmission level before the power transmitter starts transmitting power. The power transmission
(Continued)

level includes at least an unavailable level indicating that power transmission is impossible, a limitation level indicating that power transmission is possible under a predetermined limitation, and a normal level indicating that power transmission is possible without limitation.

14 Claims, 9 Drawing Sheets

(51) Int. Cl.
  *H02J 50/80*  (2016.01)
  *H02J 50/10*  (2016.01)
  *H02J 7/04*  (2006.01)
  *H02J 7/02*  (2016.01)
  *B60L 50/50*  (2019.01)
  *B60L 53/30*  (2019.01)
  *B60L 53/64*  (2019.01)
  *B60L 53/63*  (2019.01)
  *B60L 53/66*  (2019.01)

(52) U.S. Cl.
  CPC .............. *B60L 53/64* (2019.02); *B60L 53/665* (2019.02); *H02J 7/0027* (2013.01); *H02J 7/025* (2013.01); *H02J 7/04* (2013.01); *H02J 7/042* (2013.01); *H02J 50/10* (2016.02); *H02J 7/047* (2013.01); *H02J 2007/005* (2013.01); *H02J 2007/0039* (2013.01); *H02J 2007/0096* (2013.01); *Y02T 10/7005* (2013.01)

(58) Field of Classification Search
  CPC ...... H02J 7/025; H02J 7/04; H02J 2007/0039; H02J 2007/005; H02J 2007/0096; Y02T 10/7005
  USPC .......................................................... 307/104
  See application file for complete search history.

(56) References Cited

U.S. PATENT DOCUMENTS

2014/0320079 A1 10/2014 Kondo
2015/0001936 A1  1/2015 Eguchi
2016/0297314 A1 10/2016 Iwai

FOREIGN PATENT DOCUMENTS

| EP | 2751902 | | 7/2014 |
|----|---------|----|--------|
| EP | 2985870 | A1 | 2/2016 |
| JP | 2010011650 | A | 1/2010 |
| JP | 2012035789 | A | 2/2012 |
| JP | 2012055109 | A | 3/2012 |
| JP | 2013115833 | A | 6/2013 |
| JP | 2013146133 | A | 7/2013 |
| JP | 2013192281 | A | 9/2013 |
| JP | 2015008620 | A | 1/2015 |
| WO | 2011121790 | | 10/2011 |
| WO | 2013/032519 | A1 | 3/2013 |
| WO | 2014157091 | A1 | 10/2014 |
| WO | 2015068476 | | 5/2015 |
| WO | 2015072212 | A1 | 5/2015 |

OTHER PUBLICATIONS

Written Opinion issued in corresponding International Patent Application No. PCT/JP2016/064309 dated Aug. 2, 2016, consisting of 4 pp.

\* cited by examiner

Fig.5

| POWER TRANSMITTER ID | POSITION | POWER TRANSMISSION LEVEL | OPERATION HISTORY | |
| --- | --- | --- | --- | --- |
| | | | NUMBER OF TIMES | LAST DATE AND TIME |
| 101 | (x1,y1) | NORMAL LEVEL | 50 | APRIL 10, 10:00 |
| 102 | (x1,y1) | LIMITATION LEVEL (TEMPERATURE) | 40 | APRIL 10, 18:00 |
| 103 | (x2,y2) | UNAVAILABLE LEVEL (HARDWARE MALFUNCTION) | 65 | APRIL 6, 16:00 |
| 104 | (x2,y2) | NORMAL LEVEL | 60 | APRIL 10, 9:00 |
| 105 | (x3,y3) | NORMAL LEVEL | 30 | APRIL 10, 15:00 |
| 106 | (x4,y4) | LIMITATION LEVEL (FOREIGN OBJECT) | 60 | APRIL 9, 22:00 |
| ... | ... | ... | ... | ... |

Fig.7

| POWER TRANSMITTER ID | IDENTIFICATION RULE | POWER TRANSMISSION PERFORMANCE |
|---|---|---|
| 101 | RULE Ra | OUTPUT VOLTAGE=Va, OUTPUT CURRENT=Aa, CHARGING TIME=Ta ... |
| 102 | RULE Rb | ... |
| 103 | RULE Rc | ... |
| 104 | RULE Rd | ... |
| 105 | RULE Re | ... |
| 106 | RULE Rf | ... |
| ... | ... | ... |

31

SYSTEM, METHOD, AND PROGRAM FOR MANAGING POWER TRANSMISSION DEVICE

TECHNICAL FIELD

The present disclosure relates to a system, method, and program for managing a power transmitter. This application is based upon and claims the benefit of priority from Japanese Patent Application No. 2015-105345, filed on May 25, 2015, the entire contents of which are incorporated herein by reference.

BACKGROUND ART

Conventionally, a movable object (for example, an electric vehicle) including a rechargeable battery as at least a part of a power source is known. Such a movable object needs to receive power at a charging station if the remaining power of the battery becomes small. In relation to this, a mechanism for managing a state of a power transmitter that supplies power to the movable object is known.

For example, the following Patent Literature 1 describes a wireless power transfer device capable of detecting a malfunction. Specifically, a detection unit of the wireless power transfer device detects a phase difference between an output voltage and an output current output from a power supply main circuit, and a power supply side controller provides a notification indicating a malfunction using a notification device when it is determined that the phase difference is outside a specific range.

Also, in the following Patent Literature 2, a power feeding device including a warning device is described. Specifically, a power transmission ECU determines the presence or absence of a malfunction of a primary resonance coil on the basis of a signal indicating the state of the primary resonance coil detected by a detector and the warning device provides a notification of the presence/absence of a malfunction.

CITATION LIST

Patent Literature

[Patent Literature 1] JP 2013-115833 A
[Patent Literature 2] JP 2012-055109 A

SUMMARY

Technical Problem

All mechanisms described in the above-described patent literature determine whether power feeding is possible or impossible. However, the power transmitter of the wireless power transfer system may be able to perform limited power transmission even if normal power transmission (that is, unlimited power transmission) cannot be performed. There can also be demand for limited power transmission. For example, although a temperature in the device may be in an allowable range, the temperature may exceed the allowable range if normal power transmission is executed. In this case, although a power transmission time is limited, it is not impossible to transmit power. This is one aspect of limited power transmission, and there may be users who wish to receive charging while allowing this limitation. In a conventional dichotomous mechanism, such limited power transmission is handled as either possible power transmission or impossible power transmission. However, in this case, limited power transmission cannot be distinguished from normal power transmission or impossible power transmission. For example, if limited power transmission is determined to be impossible, the chance for power feeding is reduced, and the time until completion of desired charging is prolonged. It is therefore desired to provide a mode of power transmission by the power transmitter in more detail before the start of power feeding.

Solution to Problem

A management system according to an aspect of the present disclosure is a management system for a power transmitter capable of wirelessly transmitting power to a power receiver of a movable object, the management system including: a detection unit configured to detect a state of the power transmitter; a storage unit configured to store a relationship between the state of the power transmitter and a power transmission level indicating possibility of power transmission of the power transmitter; an identification unit configured to identify the power transmission level corresponding to the state detected by the detection unit with reference to the storage unit; and an output unit configured to output the power transmission level identified by the identification unit before the power transmitter starts transmitting power, wherein the power transmission level includes at least an unavailable level indicating that power transmission is impossible, a limitation level indicating that power transmission is possible under a predetermined limitation, and a normal level indicating that power transmission is possible without limitation.

Advantageous Effects

According to an aspect of the present disclosure, a mode of power transmission by the power transmitter can be provided in more detail before the start of power feeding.

BRIEF DESCRIPTION OF DRAWINGS

FIG. 5 is a diagram illustrating an example of processing results.

FIG. 7 is a diagram illustrating a concept of an identification rule used in the second embodiment.

DESCRIPTION OF EMBODIMENTS

Figure 1:
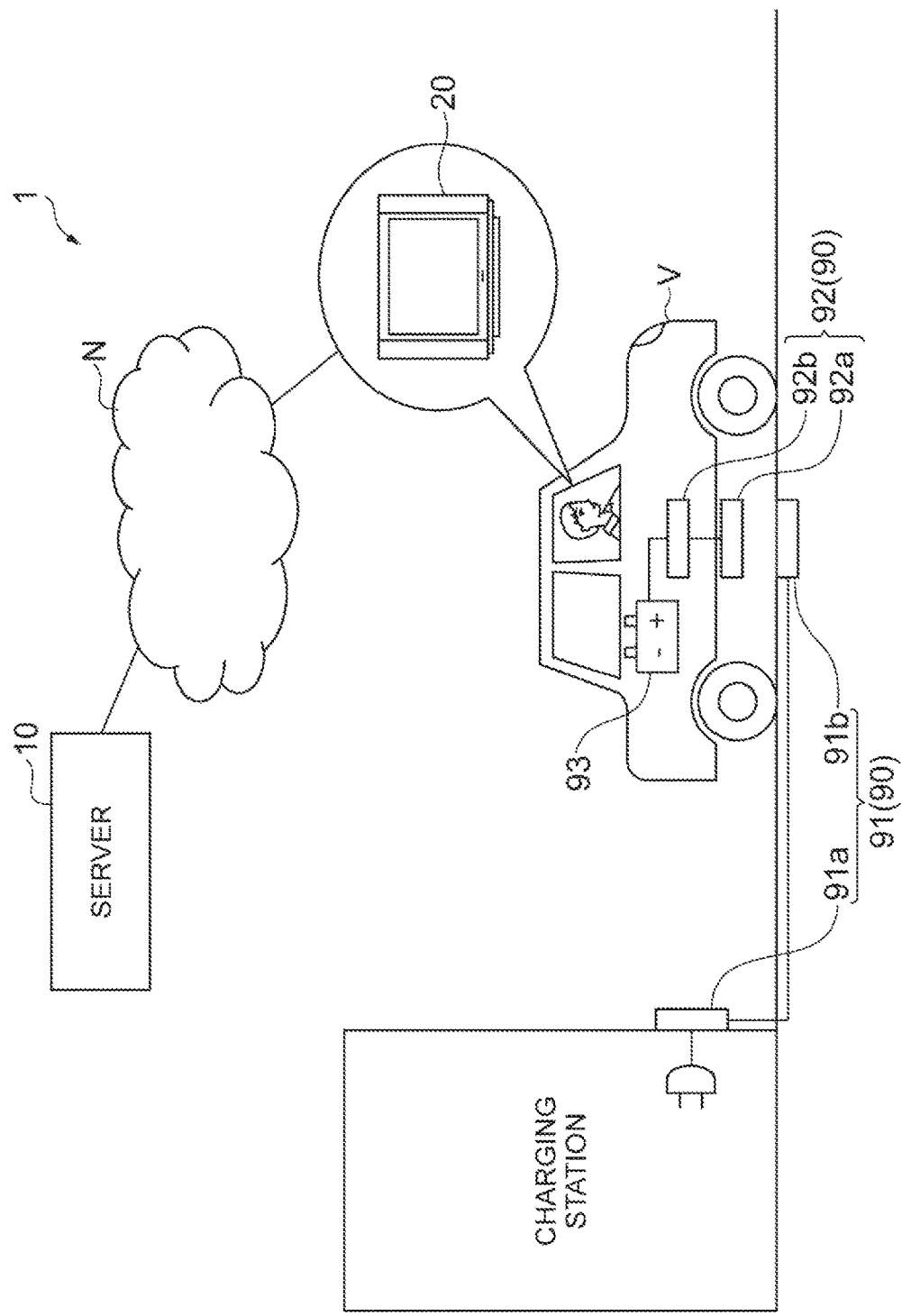
FIG. 1 is a diagram schematically illustrating a case in which a management system according to an embodiment is applied.

A management system according to an aspect of the present disclosure is a management system for a power transmitter capable of wirelessly transmitting power to a power receiver of a movable object, the management system including: a detection unit configured to detect a state of the power transmitter; a storage unit configured to store a relationship between the state of the power transmitter and a power transmission level indicating possibility of power transmission of the power transmitter; an identification unit configured to identify the power transmission level corresponding to the state detected by the detection unit with reference to the storage unit; and an output unit configured to output the power transmission level identified by the identification unit before the power transmitter starts transmitting power, wherein the power transmission level includes at least an unavailable level indicating that power transmission is impossible, a limitation level indicating that power transmission is possible under a predetermined limitation, and a normal level indicating that power transmission is possible without limitation.

A management method according to an aspect of the present disclosure is a management method to be executed by a management system for a power transmitter capable of wirelessly transmitting power to a power receiver of a movable object, the management method including: a detection step of detecting a state of the power transmitter; an identification step of identifying a power transmission level corresponding to the state detected in the detection step with reference to a storage unit storing a relationship between the state of the power transmitter and a power transmission level indicating possibility of power transmission of the power transmitter; and an output step of outputting the identified power transmission level in the identification step before the power transmitter starts transmitting power, wherein the power transmission level includes at least an unavailable level indicating that power transmission is impossible, a limitation level indicating that power transmission is possible under a predetermined limitation, and a normal level indicating that power transmission is possible without limitation.

A management program according to an aspect of the present disclosure is a management program for causing a computer system including one or more computers to function as a management system for a power transmitter capable of wirelessly transmitting power to a power receiver of a movable object, wherein the management program causes the computer system to function as: a detection unit configured to detect a state of the power transmitter; a storage unit configured to store a relationship between the state of the power transmitter and a power transmission level indicating possibility of power transmission of the power transmitter; an identification unit configured to identify the power transmission level corresponding to the state detected by the detection unit with reference to the storage unit; and an output unit configured to output the power transmission level identified by the identification unit before the power transmitter starts transmitting power, and wherein the power transmission level includes at least an unavailable level indicating that power transmission is impossible, a limitation level indicating that power transmission is possible under a predetermined limitation, and a normal level indicating that power transmission is possible without limitation.

In this aspect, a mode of power transmission is output in at least three steps such as an unavailable level (at which power transmission is impossible), a limitation level (at which limited power transmission is possible), and a normal level (at which power transmission is possible without limitation) according to a state of the power transmitter before the start of power feeding. It is possible to provide the mode of power transmission by the power transmitter in more detail by enabling a mode in which limited power transmission is possible to be output, in addition to the two modes of whether normal power transmission is possible or impossible.

In the management system according to another aspect, the identification unit may identify the power transmission level on the basis of both a charging request related to charging of the movable object and acquired from a predetermined device and the detected state. By further considering the request for charging the movable object, it is possible to identify the power transmission level according to a situation of each movable object which is a target to which power is transmitted.

In the management system according to another aspect, the power transmitter may include the detection unit, the identification unit, and the output unit. In this case, the power transmitter can identify and output the power transmission level of the power transmitter without using an intermediary device such as a server.

In the management system according to another aspect, each of a plurality of power transmitters may include the detection unit, and a server capable of communicating with the plurality of power transmitters may include the identification unit and the output unit, whereby the server identifies the power transmission level for each of the plurality of power transmitters. In this case, because the server manages the power transmission level of the plurality of power transmitters, a terminal (user) can efficiently acquire the power transmission levels of the plurality of power transmitters without accessing the individual power transmitters.

In the management system according to another aspect, the output unit may output information of a power transmitter identified to be at the normal level in preference to information of a power transmitter identified to be at the limitation level. In this case, it is possible to preferentially provide the user with information of a power transmitter that can transmit power without any particular limitation. If the power transmission level is identified in further consideration of the charging requests, a power transmitter identified to be at the limitation level for a first user (movable object) may be identified to be at the normal level for a second user (movable object). In this case, the information of the power transmitter is preferentially provided to the second user (movable object). A power transmitter that does not completely satisfy charging requests of some users (mobile objects) can completely satisfy the charging request of another user (movable object). It is possible to level off operating rates between a plurality of power transmitters in consideration of individual charging requests in this aspect. Additionally, an increase in the overall operating rate of the power transmitters in the management system can then be expected.

The management system according to another aspect may further include a database configured to store an operation history of a plurality of power transmitters, wherein the output unit may compare an operation frequency obtained from the operation history stored in the database of two or more power transmitters when the two or more power transmitters having the same power transmission level are present and output information of a power transmitter with a lower or lowest operation frequency among the two or more power transmitters in preference to information of the remaining power transmitters among the two or more power transmitters. By preferentially providing information of a power transmitter with a low operation frequency, it is possible to level off operating rates between the plurality of power transmitters and an increase in the overall operating rate of the power transmitters in the management system can be expected.

In the management system according to another aspect, the output unit may transmit the identified power transmission level of a power transmitter to a terminal of a user of the movable object together with a position of the power transmitter, whereby the terminal may display the power transmission level and the position of the power transmitter. By presenting the power transmission level and position of the power transmitter to the user in this way, it is possible to guide the user to a power transmitter identified to be convenient for the user.

Hereinafter, embodiments of the present disclosure will be described in detail with reference to the accompanying drawings. Also, in the description of the drawings, the same or equivalent elements are denoted by the same reference signs, and redundant description thereof will be omitted.

First Embodiment

A function and configuration of the management system 1 according to the first embodiment will be described with reference to FIGS. 1 to 5. The management system 1 is a computer system that manages a power transmitter capable of wirelessly transmitting power to a power receiver of a movable object. In the present embodiment, the management system 1 also plays a role of guiding the user of the movable object to a specific power transmitter.

The "movable object" is a device that transports people or objects from one place to another. The movable object includes a rechargeable battery (hereinafter simply referred to as a "battery") as at least a part of a power source. In the present embodiment, an electric vehicle is shown as an example of the movable object, but the type of movable object is not limited at all, and it may be, for example, a motorcycle, a bicycle, a train, an on-water navigation object, an underwater navigation object, or an airplane. Therefore, a route along which the movable object travels may be a land road, a waterway, or an air route.

The "user of the movable object" (hereinafter also simply referred to as the "user") is a person who wants to know information on a power transmitter in order to charge a battery of the movable object. The user may be a driver or a pilot of the movable object, a passenger of the movable object, or a person who is not in the movable object.

A position where the power transmitter is provided is not limited, and can be a public facility such as a charging station or a parking lot. Because the type of movable object is not limited, the position where the power transmitter is provided is also not limited. For example, the power transmitter can be installed along a road or may be installed in a port, an airport, or the like.

In FIG. 1, an example in which the management system 1 is applied is schematically illustrated. The management system 1 includes at least a power transmitter 91 of a wireless power transfer system 90. Although only one power transmitter 91 is illustrated in FIG. 1, the management system 1 may include a plurality of power transmitters 91. In order to provide information about the power transmitter 91 to a terminal 20, the management system 1 may further include a server 10. The power transmitter 91, the server 10, and the terminal 20 can transmit and receive data to and from each other via a communication network N. The configuration of the communication network N is not limited at all, and the communication network N may be constructed by any communication network such as the Internet or an intranet.

The wireless power transfer system 90 includes the power transmitter 91 and a power receiver 92, and wirelessly supplies electric power from the power transmitter 91 to the power receiver 92 using magnetic coupling between the coils, such as a magnetic field resonance method or an electromagnetic induction method. The power transmitter 91 includes a transmission power conversion device (for example, a rectification circuit, a DC/DC converter, an inverter circuit, or the like) 91a and a power transmission coil device 91b. The power receiver 92 includes a power reception coil device 92a and a received power conversion device (for example, a rectification circuit, a DC/DC converter, or the like) 92b, and is mounted on a movable object V. The electric power sent to the power receiver 92 is accumulated in a battery 93 of the movable object V. Both the power transmitter 91 and the power receiver 92 include hardware elements such as a processor, a memory, an input/output interface, a communication interface, and the like. Also, a method of wirelessly transmitting power is not limited to a magnetic field resonance method and an electromagnetic induction method, and other methods such as an electromagnetic coupling method and a radio wave method may be used.

The server 10 is a computer that manages information about the power transmitter 91. For example, the server 10 can be a server of a guidance system such as a car navigation system. Although only one server 10 is illustrated in FIG. 1, the management system 1 may include a plurality of servers 10.

The terminal 20 is a computer that displays information about the power transmitter 91 to the user, and is also referred to as a user terminal. The type of computer used as the terminal 20 is not limited, and the terminal 20 may or may not be mounted on the movable object V. For example, the terminal 20 may be a car navigation system, or a portable terminal such as a high-function portable phone (smartphone), a portable phone, a portable information terminal (PDA), a tablet, a laptop personal computer, or the like. If the terminal 20 is not mounted on the movable object V, the terminal 20 may or may not be connectable to the system in the movable object V. Although only one terminal 20 is shown in FIG. 1, the management system 1 may include a plurality of terminals 20.

The management system 1 identifies the power transmission level of the power transmitter 91 and outputs an identification result. The management system 1 may identify and output the power transmission level in response to a charging request from the terminal 20 or may identify and output the power transmission level without acquiring the charging request. The power transmitter 91 may directly receive the charging request from the terminal 20 or may receive it via the server 10. Also, the power transmitter 91 may directly transmit the processing result (the identified power transmission level) to the terminal 20 or may transmit the processing result via the server 10. The management system 1 may temporarily store the processing result in the database 30 and may transmit the processing result read from the database 30 to the terminal 20 or may directly transmit the processing result to the terminal 20 without storing the processing result in the database 30. As described above, a timing at which the power transmission level is identified and the method of data transmission/reception between the devices are not limited at all. Representative aspects will be exemplified below.

The "power transmission level" is an index indicating a possibility of power transmission by the power transmitter (in other words, a possibility of supplying power from the power transmitter to the power receiver). The power transmission level not only indicates whether or not power transmission is possible, but also indicates how much power can be transmitted when power transmission is possible. In the present embodiment, the power transmission level includes at least three levels such as an unavailable level, a limitation level, and a normal level, and one power transmission level is identified from a plurality of candidates. The unavailable level means that power transmission is impossible. The limitation level means that power transmission is possible under a predetermined limitation. The normal level means that power transmission is possible without limitation. For example, the normal level indicates that power transmission according to specifications of the power transmitter is possible.

The "limitation" for distinguishing the limitation level from the normal level is a concept determined only by a relative relationship between these two types of level. That is, "no limitation" at the normal level means that there is no limitation applied at the limitation level, but does not mean that the power transmission can be completely and unlimitedly performed. For example, if the power itself provided to the power transmitter 91 is limited, there may be a case in which the battery 93 of the movable object V cannot be fully charged even at a normal level.

A type of limitation that exists at the limitation level and does not exist at the normal level is not limited. Examples of such a limitation may include a limitation related to power (whose unit is kilowatts (kW)), a limitation related to a possible power transmission time (whose unit is hours (h)), a limitation related to an amount of power (whose unit is kilowatt-hours (kWh)), and a limitation related to power efficiency (%). Alternatively, limits based on combinations of any plurality of parameters selected from these parameters may be used. Furthermore, limits based on other parameters different from these parameters may be used.

For example, if the power (normal power) guaranteed at the normal level is denoted by $P_N$, a power range of $P_{L\ min}$ to $P_{L\ max}$ guaranteed at the limitation level is less than $P_N$. Here, the value $P_{L\ min}$ is a minimum value of the power at the limitation level, and the value $P_{L\ max}$ is a maximum value of the power at the limitation level. If the guaranteed power is less than $P_{L\ min}$, the power transmission level is the unavailable level.

For example, if the possible power transmission time (normally possible time) guaranteed at the normal level is greater than or equal to $H_{N\ min}$, a range $H_{L\ min}$ to $H_{L\ max}$ of the possible power transmission time guaranteed at the limitation level is less than $H_{N\ min}$. Here, the value $H_{L\ min}$ is a minimum value of the possible power transmission time at the limitation level, and the value $H_{L\ max}$ is a maximum value of the possible power transmission time at the limitation level. If the guaranteed possible power transmission time is less than $H_{L\ min}$, the power transmission level is the unavailable level.

For example, if the amount of power guaranteed at the normal level (normal amount of power) is greater than or equal to $W_{N\ min}$, a range of $W_{L\ min}$ to $W_{L\ max}$ of the amount of power guaranteed at the limitation level is less than $W_{N\ min}$. Here, the value $W_{L\ min}$ is a minimum value of the amount of power at the limitation level, and the value $W_{L\ max}$ is a maximum value of the amount of power at the limitation level. If the amount of power guaranteed is less than $W_{L\ min}$, the power transmission level is the unavailable level.

For example, if the power efficiency (not normal efficiency) guaranteed at the normal level is $E_{N\ min}$ or more, a power efficiency range of $E_{L\ min}$ to $E_{L\ max}$ guaranteed at the limitation level is less than $E_{N\ min}$. Here, the value $E_{L\ min}$ is a minimum value of the power efficiency at the limitation level, and the value $E_{L\ max}$ is a maximum value of the power efficiency at the limitation level. If the guaranteed power efficiency is less than $E_{L\ min}$, the power transmission level is the unavailable level.

At least one of the normal level and the limitation level may further be subdivided into a plurality of levels on the basis of any parameter. For example, assuming that a minimum amount of power guaranteed at the normal level is denoted by $W_{Na}$ and $W_{Nb}$ ($>W_{Na}$) is further set as the amount of power at the normal level, the normal level Na at which the amount of power is greater than or equal to $W_{Na}$ and less than $W_{Nb}$ and the normal level Nb at which the amount of power is greater than or equal to $W_{Nb}$ can be set. At this time, the amount of power at the limitation level is naturally necessarily limited to less than $W_{Na}$. In another example, if the range of $H_{L\ min}$ to $H_{L\ max}$ of the possible power transmission time guaranteed at the limitation level is divided into a range Ra that is greater than or equal to $H_{L\ min}$ and less than $H_{La}$, a range Rb that is greater than or equal to $H_{La}$ and less than $H_{Lb}$, and a range Rc that is greater than or equal to $H_{Lb}$ and less than or equal to $H_{L\ max}$, a limitation level La corresponding to the range Ra, a limitation level Lb corresponding to the range Rb, and a limitation level Lc corresponding to the range Rc are set.

The "charging request" is information indicating a request relating to charging the battery 93 of the movable object V. Specific content of the charging request is not limited, and may be, for example, the current remaining power (state of charge (SOC)) of the battery, a necessary or desired amount of charging, or a charging time. For example, the charging request may indicate the SOC being changed from the current 30% to 100%, that a time period capable of being spent on charging is at most 1 hour, or the SOC being increased from the current 40% to 80% within 2 hours.

Figure 2:
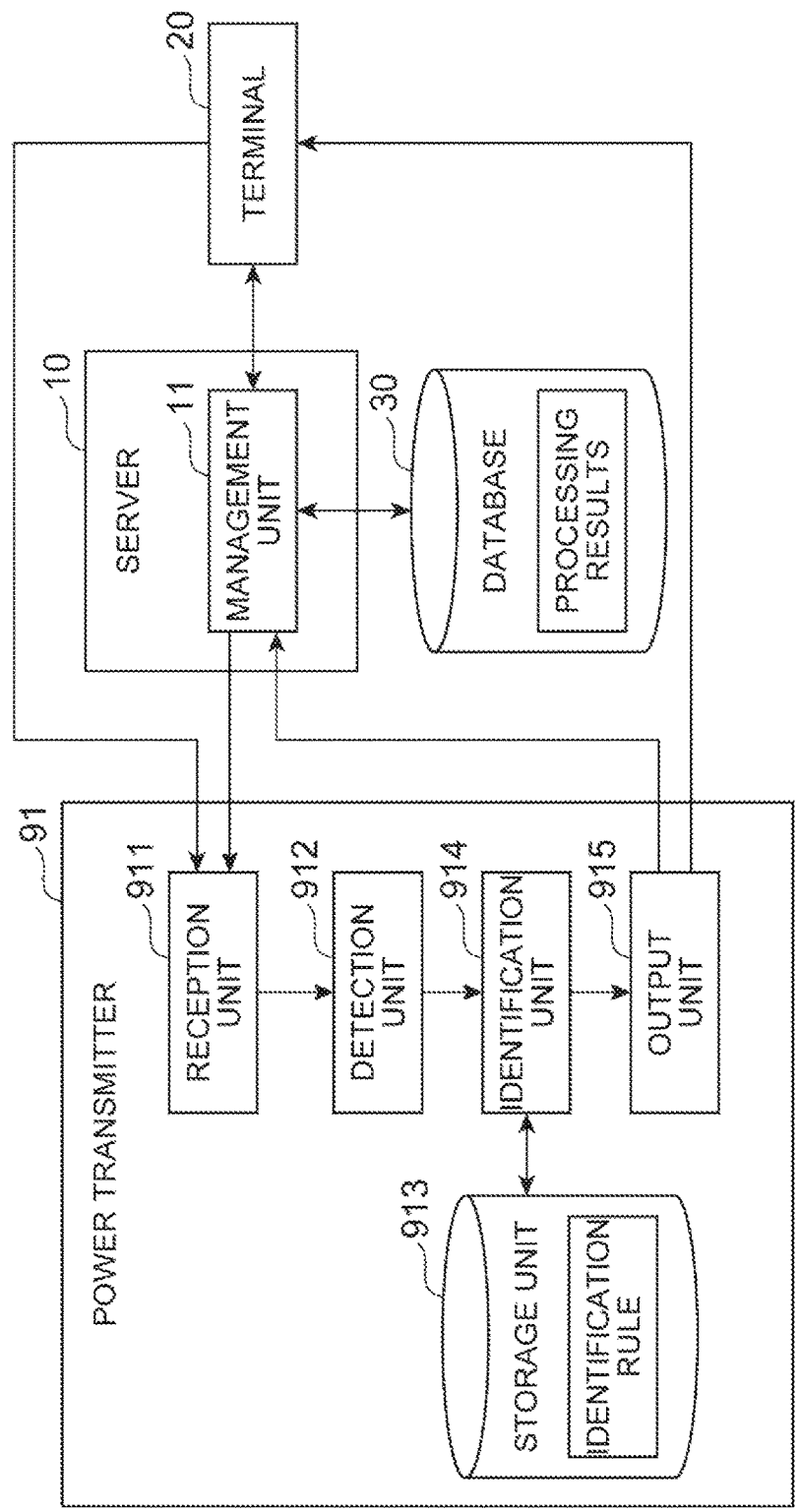
FIG. 2 is a block diagram illustrating a functional configuration of a management system according to a first embodiment.

Next, a functional configuration of the power transmitter 91 will be described. As illustrated in FIG. 2, the power transmitter 91 includes a reception unit (for example, a receiver) 911, a detection unit (for example, a detector) 912, a storage unit (for example, a memory) 913, an identification unit (for example, a controller) 914, and an output unit (for example, an output device) 915 as functional components. These functional components are realized by a processor executing a management program installed in the power transmitter 91 to control hardware elements such as a memory and a communication interface.

The reception unit 911 is a functional component that receives a charging request from the terminal 20 or the server 10. The reception unit 911 is realized by the processor executing the management program, reading and writing data from and to the memory, and controlling the communication interface. The reception unit 911 outputs the received charging request to the detection unit 912.

The detection unit 912 is a functional component that detects the state of the power transmitter 91. The detection unit 912 is realized by a processor executing the management program, reading and writing data from and to the memory, and controlling the sensor provided in the power transmitter 91.

The "state of the power transmitter" is a state inside or outside the power transmitter at a certain point in time. A type of detected state is not limited.

For example, the detection unit 912 may detect states of hardware elements such as circuits in the power transmitter 91 (for example, an inverter circuit, a rectification circuit, a resonance circuit, and a communication circuit), a device attached to the power transmitter 91 (for example, a foreign object detection device), or the like. By incorporating a current/voltage sensor in the power transmitter 91, the detection unit 912 can detect whether these hardware elements are normal or abnormal (for example, short circuit, element breakage, and sensor failure) or detect the operational situation of the hardware elements.

Alternatively, the detection unit 912 may detect a temperature in the power transmitter 91. Here, the temperature in the power transmitter may be a temperature of an internal space of the power transmitter 91, or a temperature of a specific component of the power transmitter 91 (an element temperature of each circuit, a ferrite temperature of the resonance circuit, or the like). By incorporating a temperature sensor in the power transmitter 91, the detection unit 912 can detect a temperature.

Alternatively, the detection unit 912 may detect a foreign object existing around the power transmitter 91. Here, the "foreign object" is an object that may reduce power efficiency or impede power transmission. For example, the detection unit 912 may detect a foreign object that is likely to be present between the power transmitter 91 and the power receiver 92. The detection unit 912 can detect the foreign object by providing a foreign object detection coil formed by a conductive wire as the detection unit 912 in the power transmitter 91 and detecting the disturbance of a magnetic flux connected with a coil as a change in an induced voltage. Also, it can be determined that the power efficiency decreases as the change in the induced voltage of the detection unit 912 (hereinafter also simply referred to as the "change in the induced voltage") increases.

A timing at which the detection unit 912 operates is not limited. For example, the detection unit 912 may detect the state of the power transmitter 91 in response to an input of a charging request from the reception unit 911 or may detect the state of the power transmitter 91 at any timing (for example, periodically) without receiving the input of the charging request.

The detection unit 912 generates state information indicating the detected state and outputs the information to the identification unit 914. If the charging request has been input, the detection unit 912 outputs the state information to the identification unit 914 together with the charging request. A method of representing the state information may be arbitrarily defined. For example, the state information may be represented in binary (for example, "0" or "1") or the measured value may be used as the state information as it is. As an example, whether the hardware element is normal or abnormal and whether or not there is a foreign object can be represented in binary, and the temperature can be represented by a measured value.

The storage unit 913 is a functional component that stores a relationship between the state of the power transmitter 91 and the power transmission level and is realized by a memory. The "relationship between the state of the power transmitter and the power transmission level" is a rule used to identify the power transmission level from the state of the power transmitter, and this rule is referred to as an "identification rule" below. The storage unit 913 stores data or an algorithm indicating this relationship (the identification rule). A method of representing the identification rule is not limited. For example, identification rules may be represented by a correspondence table illustrating the correspondence relationship between the state of the power transmitter 91 and the power transmission level. Alternatively, the identification rules may be represented by a predetermined algorithm for calculating the power transmission level without using a correspondence table. In any case, by using the identification rules, one power transmission level is identified when the state of the power transmitter 91 is given as a condition.

As described above, because the state and the power transmission level of the power transmitter 91 may all vary, various relationships between the state and the power transmission level can be set. Therefore, the content of the identification rules is not limited at all. Hereinafter, some examples of identification rules are shown.

The storage unit 913 may store a correspondence relationship between the state of the hardware element in the power transmitter 91 and the power transmission level as an identification rule. For example, the storage unit 913 may store a correspondence table illustrating the following relationships $R_{a1}$ to $R_{a3}$.

$R_{a1}$: Normal level if all circuits in the device are normal.

$R_{a2}$: Limit level if circuits (for example, an inverter circuit, a rectification circuit, and a resonance circuit) essential for power transmission are all normal, but a circuit which is not directly involved in power transmission (for example, a communication circuit) is abnormal.

$R_{a3}$: Unavailable level if there is a malfunction in any circuit essential for power transmission.

Alternatively, a case in which there is a malfunction in a communication circuit which is not directly involved in power transmission may correspond to the normal level. As still another example, if a circuit essential for power transmission is duplicated and a backup system is operating instead of the not mal system, this state may be made to correspond to the limitation level.

The storage unit 913 may store a relationship between a temperature in the power transmitter 91 (hereinafter also simply referred to as a "temperature") and the power transmission level as an identification rule. Because the power transmission function of the power transmitter 91 is not exerted when the detected temperature exceeds the allowable range, the management system 1 determines that power transmission is impossible. When the temperature in the power transmitter 91 is expected to exceed the allowable range merely by performing the power transmission for a relatively short time even if the detected temperature is in the allowable range, the management system 1 limits a power transmission time. In order to make such a determination, the storage unit 913 stores a relationship between the power transmission time and a temperature rise in the power transmitter 91. Because the amount of power is proportional to time, the relationship between an amount of supplied power and the temperature rise can also be shown like the relationship between the time and the temperature rise. Therefore, the storage unit 913 may store the relationship between the amount of supplied power from the power transmitter 91 and the temperature rise.

Figure 3:
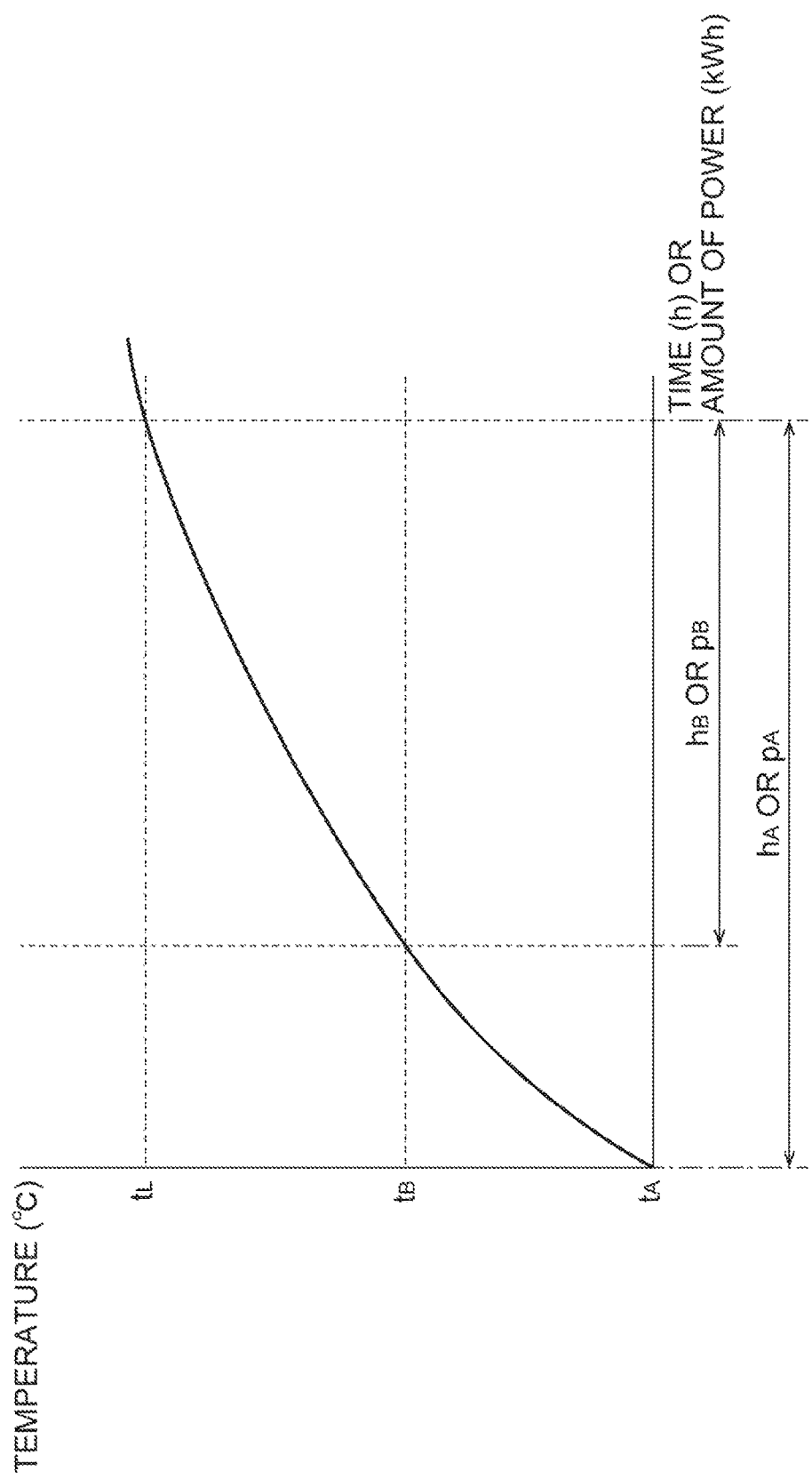
FIG. 3 is a graph illustrating an example of an identification rule.

FIG. 3 is a graph illustrating an example of such a relationship, wherein the vertical axis represents a temperature (° C.) and the horizontal axis represents a time (h) or an amount of power (kWh). This graph shows a change in temperature in a case in which the power transmitter 91 is continuously operated from the time at which a temperature in the power transmitter 91 is a standard value $t_A$. A value $t_L$ is a limit value of the allowable range of the temperature, and it is determined that power transmission from the power transmitter 91 is impossible if the temperature exceeds the value $t_L$. If a temperature at the time of the start of power transmission is $t_A$, a maximum power transmission time is $h_A$ (or the maximum amount of supplied power is $p_A$). If the temperature at the time of the start of power transmission is $t_B$ greater than $t_A$ for a reason such as a short elapsed time from the last power feeding, the possible power transmission time is $h_B$ shorter than $h_A$ (or an amount of power capable of being supplied is $p_B$ smaller than $P_A$). If the temperature is $t_B$ and the time required for charging or the required charging time is longer than $h_B$, the power transmission level is identified to be the limitation level. Even if the temperature is $t_B$, when the time required for charging or the required charging time is less than or equal to $h_B$, the power transmission level is identified to be the normal level. Such identification is also similar for the amount of electric power. Thus, it can be said that the relationship between the temperature and the power transmission level is determined by a relationship between the detected temperature and the desired charging time or power amount. The storage unit 913 stores identification rules as shown in the graph of FIG. 3 in the form of data, functions, programs, or the like.

The storage unit 913 may store a correspondence relationship between the presence of a foreign object around the power transmitter 91 and a power transmission level as an identification rule. For example, the storage unit 913 may store a correspondence table indicating the following relationships $R_{b1}$ to $R_{b3}$.

$R_{b1}$: Normal level if there is no foreign object.

$R_{b2}$: Limit level if there is a foreign object, but a change in an induced voltage is less than a threshold value Ta.

$R_{b3}$: Unavailable level if there is a foreign object for which the change in the induced voltage is greater than or equal to the threshold value Ta.

The storage unit 913 may store a relationship between a plurality of types of state in the power transmitter 91 and a power transmission level as an identification rule. For example, the storage unit 913 may store a correspondence table illustrating the following relationships $R_{c1}$ to $R_{c3}$.

$R_{c1}$: Normal level if all circuits in the device are normal and there is no foreign object.

$R_{c2}$: Limit level if circuits (for example, communication circuits) which are not directly involved in power transmission are abnormal even though circuits (for example, the inverter circuit, the rectification circuit, and the resonance circuit) essential for power transmission are all normal, or if a change in an induced voltage for a foreign object is less than Ta even though a foreign object is present.

$R_{c3}$: Unavailable level if there is a malfunction in any of the circuits essential for power transmission, or there is a foreign object for which a change in an induced voltage is greater than or equal to the threshold value Ta.

Alternatively, the storage unit 913 may store a correspondence table indicating the following relationships $R_{d1}$ to $R_{d4}$. Also, a first limitation level is assumed to have a more relaxed limitation related to power transmission than a second limitation level.

$R_{d1}$: Normal level if all circuits in the device are normal and there is no foreign object.

$R_{d2}$: First limitation level if a change in an induced voltage for a foreign object is less than Ta even though a foreign object exists.

$R_{d3}$: Second limitation level if circuits (for example, the inverter circuit, the rectification circuit, and the resonance circuit) essential for power transmission are all normal, but a circuit which is not directly involved in power transmission (for example, the communication circuit) is abnormal.

$R_{d4}$: Unavailable level if there is a malfunction in any of the circuits essential for power transmission, or there is a foreign object for which a change in an induced voltage is greater than or equal to the threshold value Ta.

The storage unit 913 may further store device information indicating a power transmission performance of the power transmitter 91. This device information can be used as an additional or ancillary parameter when identifying the power transmission level using an identification rule. The power transmission performance includes an output voltage, an output current, a charging time, and the like, but the parameters indicating the power transmission performance are not limited thereto. For example, when a power transmission parameter is identified from the temperature in the power transmitter 91, the output voltage and the output current can be used when a required amount of power is obtained from a charging time indicated in the charging request.

The identification unit 914 is a functional component for identifying the power transmission level of the power transmitter 91 corresponding to the state detected by the detection unit 912. "Identification" is a process of deriving one power transmission level, and a specific method thereof is not limited. For example, both a process of identifying one power transmission level using a correspondence table and a process of obtaining a power transmission level using any algorithm are included in the concept of "identification." The identification unit 914 outputs the identified power transmission level to the output unit 915. The identification unit 914 is realized by a processor executing the management program and reading and writing data from and to the memory.

If no charging request has been input and only state information has been input, the identification unit 914 identifies a power transmission level corresponding to the state information with reference to the identification rules stored in the storage unit 913. For example, assuming that the storage unit 913 stores the relationships $R_{a1}$ to $R_{a3}$ and state information indicating a malfunction of the communication circuit is assumed to have been input, the identification unit 914 identifies that the power transmission level of the power transmitter 91 is the limitation level. In another example, the storage unit 913 is assumed to store the relationship between the temperature and the power transmission time or the amount of supplied power illustrated in FIG. 3 as an identification rule. In this case, the identification unit 914 may identify the power transmission level by applying a predetermined default value of a power transmission time or an amount of supplied power to an identification rule (for example, a time or an amount of power required for causing the SOC to become 100% from 0%). For example, when the temperature indicated by the state information is $t_X (<t_L)$ and the default value of the power transmission time or the amount of supplied power is applied to the identification rule illustrated in FIG. 3, the identification unit 914 identifies that the power transmission level is the limitation level if the temperature exceeds $t_L$. If the temperature indicated by the state information is greater than or equal to $t_L$, the identification unit 914 identifies that the power transmission level is the unavailable level. Alternatively, assuming that the storage unit 913 stores the above-described relationships $R_{b1}$ to $R_{b3}$, the identification unit 914 identifies that the power transmission level of the power transmitter 91 is the unavailable level if state information indicating the presence of a foreign object for which a change in the induced voltage is a value D (where D≥Ta) is assumed to have been input.

If a charging request has also been input in addition to the state information, the identification unit 914 may further identify the power transmission level on the basis of the charging request. However, if it is identified that the power transmission level is the unavailable level on the basis only of the state information, the identification unit 914 regards the "unavailable level" as the final processing result without considering the charging request.

For example, the storage unit 913 may be assumed to store the identification rule illustrated in FIG. 3 and device information. Also, state information indicating a temperature in the power transmitter 91 and a charging request indicating that the "SOC is changed from the current 30% to 100%" are assumed to have been input. In this case, the identification unit 914 calculates a time required to satisfy the charging request (a time required for charging) on the basis of the charging request and the device information. Subsequently, the identification unit 914 determines whether or not the temperature in the power transmitter 91 will exceed the allowable range during the requested charging (whether or not the temperature will exceed $t_L$) on the basis of the required time, the current temperature in the device indicated by the state information, and the identification rule. The identification unit 914 identifies that the power transmission level is the normal level if the temperature does not exceed the allowable range and the identification unit 914 determines that the power transmission level is the limitation level if the temperature exceeds the allowable range. If the temperature indicated by the state information is outside the allowable range, the identification unit 914 identifies that the power transmission level is the unavailable level without considering the charging request.

The output unit 915 is a functional component that outputs the power transmission level identified by the identification unit 914. The output unit 915 is realized by a processor executing the management program, reading and writing data from and to the memory, and controlling the communication interface.

The output unit 915 outputs processing results including an identified power transmission level and a power transmitter ID. The processing result may indicate why the level is identified to be the limitation level or the unavailable level (for example, a "hardware malfunction," a "temperature," or the like). The power transmitter ID is an identifier for identifying each power transmitter and stored in the memory of the power transmitter 91 in advance. The output unit 915 may transmit the processing results to the server 10, transmit the processing results to the terminal 20, or may output the processing results to another computer system (not illustrated) other than the management system 1. The output destination of the processing results is not limited as long as a person such as a user of the movable object V or an operator of the management system 1 is eventually able to ascertain the power transmission level of the power transmitter 91.

Next, the functional configuration of the server 10 will be described. As illustrated in FIG. 2, the server 10 includes a management unit (for example, a controller) 11 as a functional component.

Figure 4:
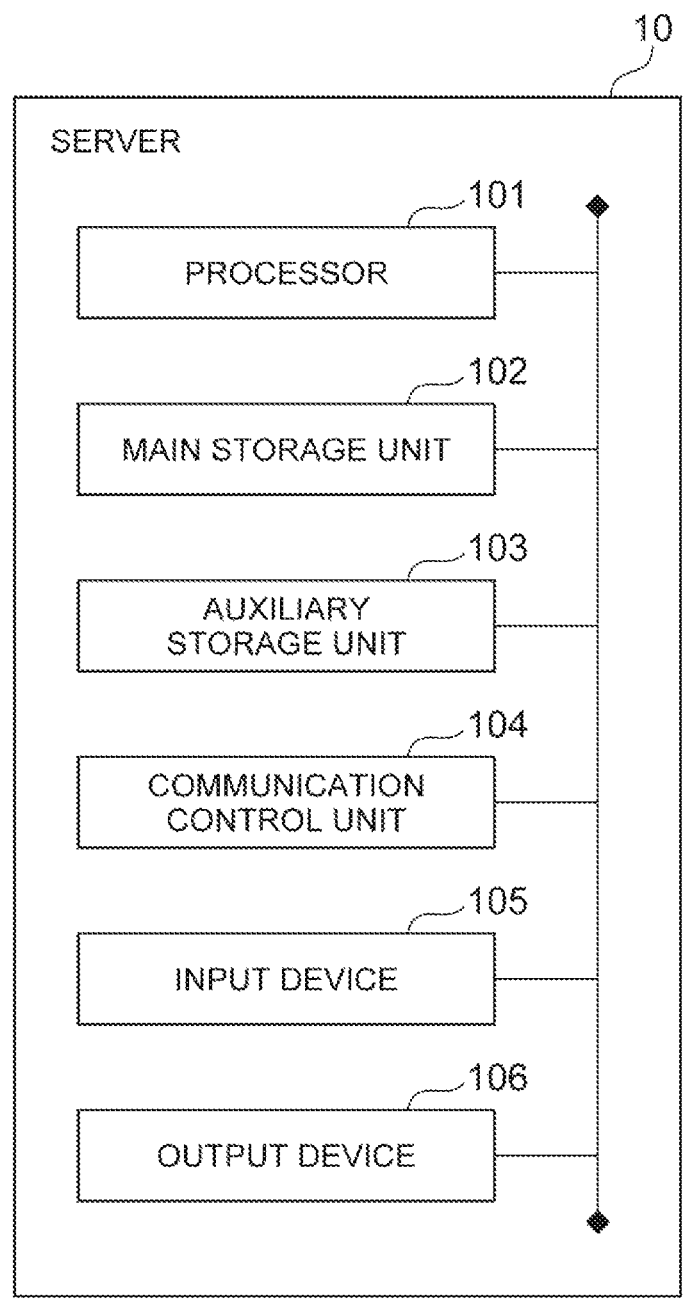
FIG. 4 is a diagram illustrating a hardware configuration of a server.

A general hardware configuration of the server 10 is illustrated in FIG. 4. The server 10 includes a processor 101 that executes an operating system, an application program, or the like, a main storage unit 102 including a ROM and a RAM, an auxiliary storage unit 103 including a hard disk, a flash memory, and the like, a communication control unit 104 including a network card or a wireless communication module, an input device 105 such as a keyboard or a mouse, and an output device 106 such as a display.

Each functional component of the server 10 is realized by causing predetermined software to be loaded on the processor 101 or the main storage unit 102 and operating the communication control unit 104, the input device 105, the output device 106, or the like under the control of the processor 101, and mainly reading and writing data in the storage unit 102 or the auxiliary storage unit 103. Data or a database necessary for processing is stored in the main storage unit 102 or the auxiliary storage unit 103.

The management unit 11 is a functional component for managing identified power transmission levels of one or more power transmitters 91. More specifically, the management unit 11 stores the identified power transmission levels in the database 30 or transmits them to the terminal 20. The management unit 11 is realized by the processor 101 executing a management program installed in the server 10, reading and writing data from and to the main storage unit 102 or the auxiliary storage unit 103, and controlling the communication control unit 104.

The management unit 11 stores records indicating processing results (a power transmitter ID and a power transmission level) received from the power transmitter 91 in the database 30. One record indicating the processing result of one power transmitter 91 may include another attribute related to the power transmitter 91. The management unit 11 can receive the processing results from the plurality of power transmitters 91, and thus the database 30 can store a plurality of records of the plurality of power transmitters 91.

FIG. 5 illustrates an example of a record stored in the database 30. In this example, reasons (a "temperature," a "hardware malfunction," and a "foreign object") of the limitation level and the unavailable level are registered as parts of the processing results, but registration of the reasons may be omitted. From FIG. 5, for example, it can be seen that power transmitters 91 whose IDs are "101," "104," and "105" can be used without a particular limitation, and a power transmitter 91 whose ID is "102" or "106" is limited at the time of power transmission, and the power transmitter 91 whose ID is "103" cannot be used.

In the example of FIG. 5, records include a geographical position where the power transmitter 91 is installed (hereinafter simply referred to as a "position") and an operation history of the power transmitter 91 in addition to the power transmitter ID and the power transmission level. In FIG. 5, the position of the power transmitter 91 is indicated by two-dimensional coordinates (x, y) represented by latitude and longitude, but a method of representing the position is not limited, and the position may be indicated by another value such as an address. The operation history is records of past power transmission of the power transmitter 91. In FIG. 5, the operation history is indicated by a combination of the number of operations and the last operation date and time, but the method of representing the operation history is not limited. For example, the operation history may be a set of past operation dates/times, or may be indicated by either the number of operations or the last operation date/time, or may be an average value of the number of operations per unit time (for example, per day). This operation history is registered or updated every time power transmission is performed in the power transmitter 91. The method of registering/updating the operation history is not limited, and for example, the server 10 may execute a process, or another information processing device may execute a process.

A method of mounting the database 30 is not limited, and the database 30 may be, for example, a relational database or a CSV file. The structure of each record is not limited to the example of FIG. 5, other items may be included in the record, some of the items illustrated in FIG. 5 may be omitted as required, or any normalization or redundancy may be performed. For example, data illustrated in FIG. 5 may be divided into a table indicating a power transmission level of each power transmitter 91 and a table indicating a position and a movement history of each power transmitter 91.

The management unit 11 can notify the user of the power transmission level of the power transmitter 91 by transmitting the processing result to the terminal 20. The management unit 11 may transmit the processing results to the terminal 20 in response to receiving a request from the terminal 20 or may push the processing results to one or more terminals 20 at any timing (for example, periodically) without requiring the reception of the processing results.

When receiving the charging request from the terminal 20, the management unit 11 transmits the charging request to at least one power transmitter 91, and receives the processing results sent from each power transmitter 91 in response to this transmission. Then, the management unit 11 transmits one or more received processing results to the terminal 20 as a response to the charging request. The terminal 20 displays the processing results. If the management unit 11 transmits a processing result indicating the position of the power transmitter 91 to the terminal 20, the terminal 20 can display a power transmission level and an address of each power transmitter 91, and the user can determine a power transmitter 91 to be used while viewing information thereof. In order to obtain information about the power transmitter 91 of a specific area only, the charging request may include a current position of the user or the movable object V and a search range (for example, within a radius of 5 km or the like).

When not receiving a charging request from the terminal 20, the management unit 11 reads the processing result of each power transmitter 91 from the database 30, and transmits information thereof to the terminal 20. Alternatively, in order to obtain information about the power transmitter 91 in a specific area only, the management unit 11 may receive a request including a current position of the user or the movable object V and a search range from the terminal 20 and transmit only processing results of the power transmitters 91 within an area matching the request as a response to the terminal 20.

Regardless of whether or not a charging request is received, the management unit 11 may transmit information of a power transmitter 91 identified to be at the normal level to the terminal 20 in preference to information of a power transmitter 91 identified to be at the limitation level. Here, "transmitting (outputting) certain information (first information) in preference to other information (second information)" means that at least the first information is output so that the user can easily recognize the first information rather than the second information. A technique of realizing the above is not limited, and for example, the management unit 11 may output only the first information without outputting the second information, or both pieces of information may be output after the display order is set so that the first information is displayed before the second information. For example, the management unit 11 may transmit only the processing result of a power transmitter 91 whose power transmission level is the normal level. In this case, it is possible to provide the user with guidance of only information of a power transmitter capable of charging the battery of the movable object without any particular limitation.

Alternatively, the management unit 11 may transmit only the processing results indicating either the normal level or the limitation level. In this case, it is possible to guide users to more chargeable power transmitters.

If the charging request is considered, it may be determined that one power transmitter 91 is at the normal level for a certain user and at the limitation level for another user. That is, a power transmitter 91, which does not completely satisfy charging requests of some users, can completely satisfy a charging request of another user. By outputting information of a power transmitter 91 identified to be at the normal level in preference to information of a power transmitter 91 identified to be at the limitation level, it is also possible to guide the other user to a power transmitter 91 which does not completely satisfy the charging requests of some users. As a result, it is possible to level off operating rates among a plurality of power transmitters 91 and increase the overall operating rate of the power transmitters 91 in the management system 1.

Furthermore, the management unit 11 may execute the following processing if there are two or more power transmitters 91 having the same power transmission level. In other words, the management unit 11 first compares operation frequencies obtained from the operation history in the database 30 of the power transmitters 91. Then, the management unit 11 transmits (outputs) information of a power transmitter 91 with a low operation frequency among the two or more power transmitters in preference to information of the remaining power transmitters 91. Here, the definition of "preference" is similar to in the above ("outputting at least the first information so that the user can easily recognize the first information rather than the second information"). The "power transmitter with a low operation frequency" is a power transmitter having a lower operation frequency than at least one power transmitter among the two or more power transmitters. Criteria for dividing two or more power transmitters into two groups are not limited. For example, the management unit 11 may set a power transmitter other than a power transmitter with a highest operation frequency as the "power transmitter with a low operation frequency." Alternatively, the management unit 11 may set only a power transmitter with a lowest operation frequency as the "power transmitter with a low operation frequency." Alternatively, the management unit 11 may sort two or more power transmitters in ascending order or descending order of the operation frequency, and set about half of the power transmitters with lower operation frequencies as the "power transmitters with a low operation frequency." A method of obtaining the operation frequency is also not limited. For example, the management unit 11 may regard the number of operations as the operation frequency as is, or may determine that the operation frequency decreases as the elapsed time from the last operation date/time increases.

Assuming that the database 30 stores the processing results illustrated in FIG. 5, the power transmitters at the normal level are the three power transmitters whose IDs are "101," "104," and "105." If the number of operations is regarded as the operation frequency as is, "105," "101," and "104" are shown when the IDs of the three power transmitters are sorted in ascending order of the number of operations. Therefore, the management unit 11 may determine only a power transmitter whose ID is "105" as a "power transmitter with a low operation frequency," or determine only the two power transmitters whose IDs are "105" and "101" as "power transmitters with a low operation frequency." If the operation frequency is set on the basis of a length of the elapsed time from the last operation date and time, "104," "101," and "105" are shown when the IDs of the three power transmitters 91 are sorted in descending order of the elapsed time. Therefore, the management unit 11 may determine only a power transmitter whose ID is "104" as a "power transmitter with a low operation frequency," or determine only two power transmitters whose IDs are "104" and "101" as "power transmitters with a low operation frequency."

By transmitting information of a power transmitter 91 having a relatively low operation frequency to the terminal 20, the user is prompted to use that power transmitter 91, it is possible to level off the operating rates of the plurality of power transmitters 91 by avoiding a situation in which only a specific power transmitter 91 is used much. This can lead to an increase in the overall operating rate of the power transmitters 91 in the management system 1.

Second Embodiment

A function and configuration of a management system 1A according to the second embodiment will be described with reference to FIGS. 6 and 7. The second embodiment is different from the first embodiment in that a server identifies the power transmission level of a power transmitter. In the following, matters specific to the second embodiment will be described in detail, and description of matters similar to those in the first embodiment will be omitted.

Figure 6:
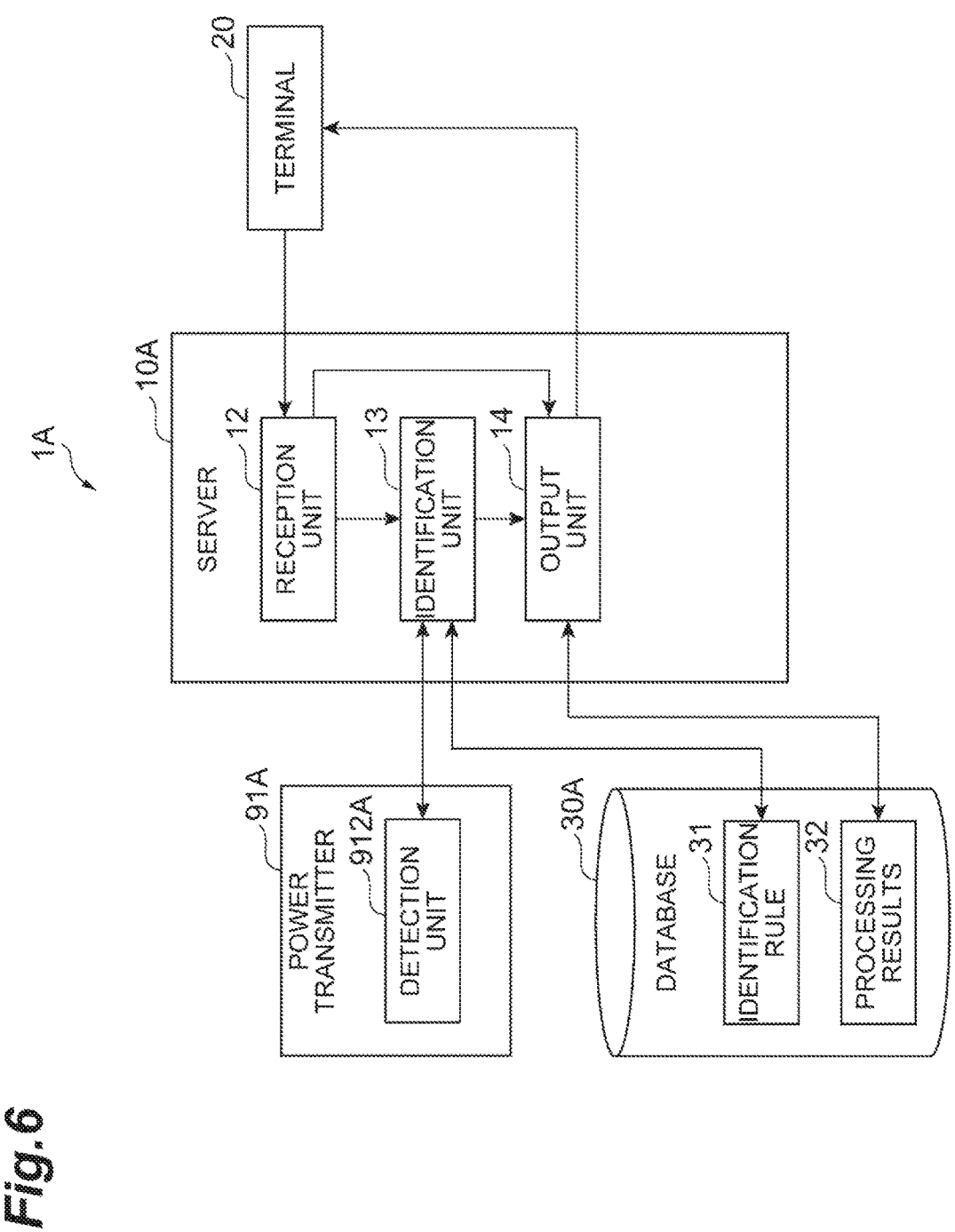
FIG. 6 is a block diagram illustrating a functional configuration of a management system according to a second embodiment.

As illustrated in FIG. 6, the management system 1A includes at least a power transmitter 91A and a server 10A, and provides information about the power transmitter 91A to a terminal 20.

The power transmitter 91A includes a detection unit (for example, a detector) 912A as a functional component. The detection unit 912A is realized by a processor executing a management program, reading and writing data from and to a memory, and controlling a sensor and a communication module provided in the power transmitter 91A. Similar to the detection unit 912 in the first embodiment, the detection unit 912A detects any type of state related to the power transmitter 91A. A timing at which the detection unit 912A operates is not limited. For example, the detection unit 912A may detect the state of the power transmitter 91A in response to receiving a detection request from the server 10A. Alternatively, the detection unit 912A may detect the state of the power transmitter 91A at any timing (for example, periodically) without receiving an input of a detection request. The detection unit 912A generates state information indicating the detected state and transmits the information to the server 10A. The state information in the present embodiment further includes an ID of the power transmitter 91A (a power transmitter ID) so that the server 10A can identify a transmission source of the state information.

The server 10A includes a reception unit (for example, a receiver) 12, an identification unit (for example, a controller) 13, and an output unit (for example, an output device) 14 as functional components and can access a database 30A. The database 30A is a device that stores an identification rule 31 used for identifying a power transmission level of the power transmitter 91A and a processing result 32 indicating the identified power transmission level.

The reception unit 12 is a functional component that receives a charging request from the terminal 20 and outputs the request to the identification unit 13. The content and configuration of the charging request are the same as those in the first embodiment.

The identification unit 13 is a functional component that identifies the power transmission level of the power transmitter 91A corresponding to the state detected by the detection unit 912A of the power transmitter 91A. The identification unit 13 is realized by a processor 101 executing a management program installed in the server 10A, reading and writing data from and to the main storage unit 102 or the auxiliary storage unit 103, and controlling the communication control unit 104.

The identification unit 13 identifies the power transmission level using the identification rules 31. The identification unit 13 can identify power transmission levels of the plurality of power transmitters 91A, whereas the identification rules are not always the same among all the power transmitters 91A. Therefore, the identification rules 31 in the present embodiment include the power transmitter ID as a data item, whereby it is possible to distinguish the identification rule of each power transmitter 91A. An example of the identification rule 31 in this embodiment is illustrated in FIG. 7. As in the first embodiment, because the identification unit 13 may also execute an identification process using the power transmission performance of the power transmitter 91 A, each record of the identification rule 31 may further include the power transmission performance as a data item as illustrated in FIG. 7. In FIG. 7, a specific value of the identification rule is schematically shown as "Rule Ra" or the like, but the specific content and configuration of each identification rule are similar to those in the first embodiment. Also, the specific content and configuration of the power transmission performance are not limited to the example in FIG. 7.

When not receiving a charging request from the terminal 20, the identification unit 13 receives the state information from the power transmitter 91A and identifies the power transmission level corresponding to the state information (the power transmitter ID and the detected state) with reference to the identification rule 31. Before this process is executed, the identification unit 13 may transmit a detection request for obtaining the state information from one or more power transmitters 91A to each power transmitter 91A. On the other hand, when receiving a charging request from the terminal 20, the identification unit 13 transmits a detection request to one or more power transmitters 91A in response to the charging request and receives the state information sent from each power transmitter 91A in response to this transmission. Then, the identification unit 13 identifies a power transmission level corresponding to the state information (the power transmitter ID and the detected state) with reference to the identification rule 31. In any case, the identification unit 13 outputs the identified power transmission level to the output unit 14 together with the power transmitter ID.

The output unit 14 is a functional component that outputs a processing result including the input power transmission level and the power transmitter ID. The output unit 14 is realized by the processor 101 executing a management program, reading and writing data from and to the main storage unit 102 or the auxiliary storage unit 103, and controlling the communication control unit 104.

The output unit 14 may transmit the processing result to the terminal 20 without storing the processing result in the database 30A regardless of whether or not the charging request has been received. Alternatively, the output unit 14 may store the processing result in the database 30A or may output the processing result to another computer system (not illustrated) other than the management system 1A. As in the first embodiment, an output destination of the processing result is not limited as long as a person such as a user of the movable object V or an operator of the management system 1A is eventually able to ascertain a power transmission level of the power transmitter 91A.

Alternatively, the output unit 14 may read the processing result 32 from the database 30A in response to the charging request received from the terminal 20 and transmit the data to the terminal 20. Alternatively, the output unit 14 may receive a request including a current position of the user or the movable object V and a search range from the terminal 20 and transmit only the processing result 32 of the power transmitter 91A within an area that matches the request as a response to the terminal 20 in order to obtain only information about the power transmitter 91A in a specific area. A data configuration of the processing result 32 can be set as in the first embodiment (FIG. 5).

Regardless of whether or not the charging request is received, the output unit 14 may transmit information of a power transmitter 91A identified to be at the normal level to the terminal 20 in preference to information of a power transmitter 91A identified to be at the limitation level. Alternatively, the output unit 14 may transmit only a processing result indicating either the normal level or the limitation level. Alternatively, if there are two or more power transmitters 91A having the same power transmission level, the output unit 14 may compare operation frequencies obtained from an operation history in the database 30A (processing results 32) among the power transmitters 91A, and transmit (output) information of a power transmitter 91A with a low operation frequency among the two or more power transmitters in preference to information of the remaining power transmitters 91A. In this manner, the priority of output may be set as in the first embodiment and its setting method may vary as in the first embodiment.

Figure 8:
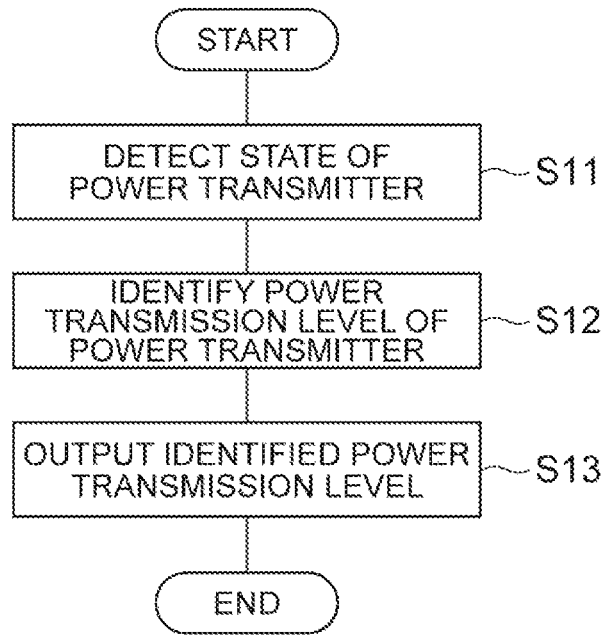
FIG. 8 is a flowchart illustrating operations of the management systems according to the first and second embodiments.

The first and second embodiments have been described above, and the processes of these embodiments can be summarized as illustrated in FIG. 8. FIG. 8 is a flowchart illustrating a management method according to the present disclosure to be executed by the management systems 1 and 1A. A process shown in this flowchart is started when the management system 1 or 1A acquires a charging request from the terminal 20 or when a predetermined execution time has been reached without receiving a charging request.

First, a state of the power transmitter 91 or 91A is detected and state information is obtained (step S11, detection step). Subsequently, a power transmission level of the power transmitter 91 or 91A is identified by referring to an identification rule using the state information (step S12, identification step). Then, the identified power transmission level is output (step S13, output step). Before the power transmission of the power transmitter 91 or 91A is started (in other words, before power feeding to the power receiver 92 of the movable object V is started), the management system 1 or 1A outputs a power transmission level of the power transmitter 91 or 91A. Therefore, the processing of step S13 described above is executed before the power transmission is started, and the processing of steps S11 and S12, which is the prerequisite for the processing of step S13, is also executed before the start of the power transmission. As described in the above-described embodiments, a device that executes the processing of each step is not limited.

Figure 9:
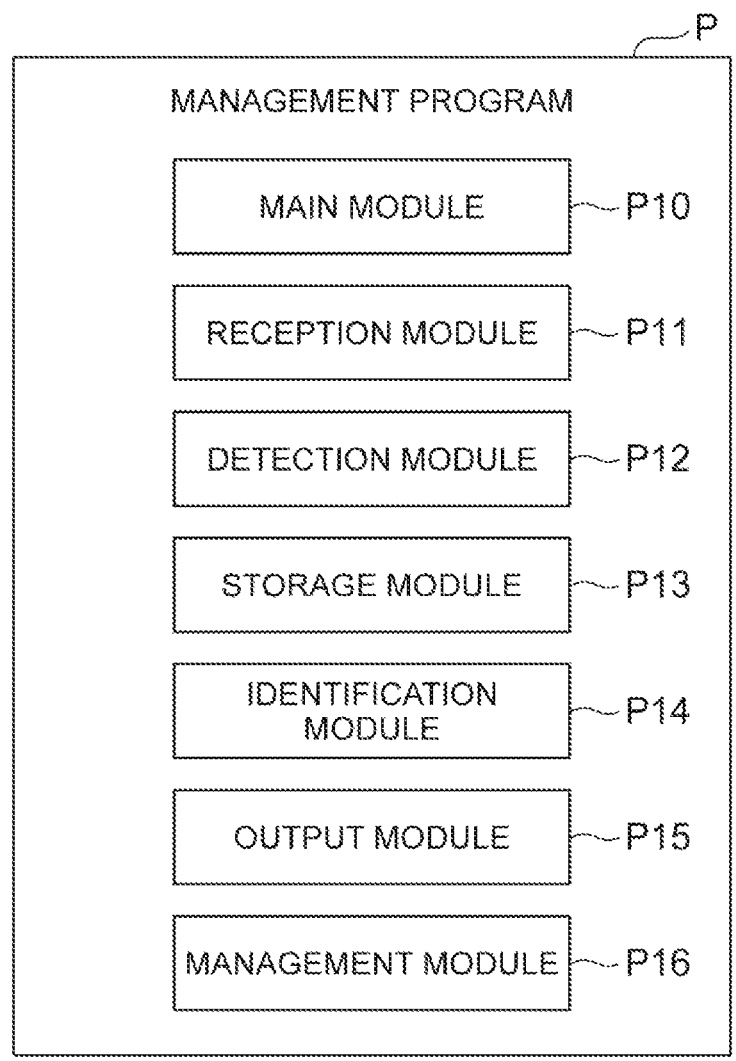
FIG. 9 is a diagram illustrating a configuration of a management program according to an embodiment.

Next, a management program P for realizing the management systems 1 and 1A will be described with reference to FIG. 9.

The management program P includes a main module P10, a reception module P11, a detection module P12, a storage module P13, an identification module P14, an output module P15, and a management module P16. The main module P10 is a part that centrally controls the management of the power transmission level of the power transmitter. The functions realized by executing the reception module P11, the detection module P12, the storage module P13, the identification module P14, the output module P15, and the management module P16 are similar to those of the reception unit, the detection unit, the storage unit (or the database), the identification unit, the output unit, and the management unit in each embodiment described above. If functional components are divided among a plurality of computers as in the above embodiments, necessary modules are provided in each computer. In the management program P corresponding to the second embodiment, the management module P16 may be omitted.

The management program P may be provided after being fixedly recorded on a tangible recording medium such as a CD-ROM, a DVD-ROM, a semiconductor memory, or the like. Alternatively, the management program P may be provided via a communication network as a data signal superimposed on carrier waves.

As described above, a management system according to an aspect of the present disclosure is a management system for a power transmitter capable of wirelessly transmitting power to a power receiver of a movable object, the management system including: a detection unit configured to detect a state of the power transmitter; a storage unit configured to store a relationship between the state of the power transmitter and a power transmission level indicating possibility of power transmission of the power transmitter; an identification unit configured to identify the power transmission level corresponding to the state detected by the detection unit with reference to the storage unit; and an output unit configured to output the power transmission level identified by the identification unit before the power transmitter starts transmitting power, wherein the power transmission level includes at least an unavailable level indicating that power transmission is impossible, a limitation level indicating that power transmission is possible under a predetermined limitation, and a normal level indicating that power transmission is possible without limitation.

A management method according to an aspect of the present disclosure is a management method to be executed by a management system for a power transmitter capable of wirelessly transmitting power to a power receiver of a movable object, the management method including: a detection step of detecting a state of the power transmitter; an identification step of identifying a power transmission level corresponding to the state detected in the detection step with reference to a storage unit storing a relationship between the state of the power transmitter and a power transmission level indicating possibility of power transmission of the power transmitter; and an output step of outputting the identified power transmission level in the identification step before the power transmitter starts transmitting power, wherein the power transmission level includes at least an unavailable level indicating that power transmission is impossible, a limitation level indicating that power transmission is possible under a predetermined limitation, and a normal level indicating that power transmission is possible without limitation.

A management program according to an aspect of the present disclosure is a management program for causing a computer system including one or more computers to function as a management system for a power transmitter capable of wirelessly transmitting power to a power receiver of a movable object, wherein the management program causes the computer system to function as: a detection unit configured to detect a state of the power transmitter; a storage unit configured to store a relationship between the state of the power transmitter and a power transmission level indicating possibility of power transmission of the power transmitter; an identification unit configured to identify the power transmission level corresponding to the state detected by the detection unit with reference to the storage unit; and an output unit configured to output the power transmission level identified by the identification unit before the power transmitter starts transmitting power, and wherein the power transmission level includes at least an unavailable level indicating that power transmission is impossible, a limitation level indicating that power transmission is possible under a predetermined limitation, and a normal level indicating that power transmission is possible without limitation.

In this aspect, a mode of power transmission is output in at least three steps such as an unavailable level (at which power transmission is impossible), a limitation level (at which limited power transmission is possible), and a normal level (at which power transmission is possible without limitation) according to a state of the power transmitter before the start of power feeding. It is possible to provide the mode of power transmission by the power transmitter in more detail by enabling a mode in which limited power transmission is possible to be output, in addition to the two modes of whether normal power transmission is possible or impossible. By outputting not only a normal level which can be said to be in an ideal state but also a limitation level considered to satisfy a certain requirement of the user, it is possible to guide the user to a power transmitter which can actually transmit electric power.

In the management system according to another aspect, the identification unit may identify the power transmission level on the basis of both a charging request related to charging of the movable object and acquired from a predetermined device and the detected state. By further considering the request for charging the movable object, it is possible to identify the power transmission level according to a situation of each movable object which is a target to which power is transmitted.

In the management system according to another aspect, the power transmitter may include the detection unit, the identification unit, and the output unit. In this case, the power transmitter can identify and output the power transmission level of the power transmitter without using an intermediary device such as a server.

In the management system according to another aspect, each of a plurality of power transmitters may include the detection unit, and a server capable of communicating with the plurality of power transmitters may include the identification unit and the output unit, whereby the server identifies the power transmission level for each of the plurality of power transmitters. In this case, because the server manages the power transmission level of the plurality of power transmitters, a terminal (user) can efficiently acquire the power transmission levels of the plurality of power transmitters without accessing the individual power transmitters. This can lead to a reduction in an amount of data flowing through the communication network.

In the management system according to another aspect, the output unit may output information of a power transmitter identified to be at the normal level in preference to the information of a power transmitter identified to be at the limitation level. In this case, it is possible to preferentially provide the user with information on a power transmitter that can transmit power without any particular limitation. If the power transmission level is identified in further consideration of the charging requests, a power transmitter identified to be at the limitation level for a first user (movable object) may be identified to be at the normal level for a second user (movable object). In this case, the information of the power transmitter is preferentially provided to the second user (movable object). A power transmitter that does not completely satisfy the charging request of some users (mobile objects) can completely satisfy the charging request of another user (movable object). It is possible to level off operating rates between a plurality of power transmitters in consideration of individual charging requests in this aspect. Additionally, an increase in the overall operating rate of the power transmitters in the management system can be expected.

The management system according to another aspect may further include a database configured to store an operation history of a plurality of power transmitters, wherein the output unit may compare an operation frequency obtained from the operation history stored in the database of two or more power transmitters when the two or more power transmitters having the same power transmission level are present and output information of a power transmitter with a lower or lowest operation frequency among the two or more power transmitters in preference to information of the remaining power transmitters among the two or more power transmitters. By preferentially providing information of a power transmitter having a low operation frequency, it is possible to level off operating rates between the plurality of power transmitters in consideration of individual charging requests and an increase in the overall operating rate of the power transmitters in the management system can be expected.

In the management system according to another aspect, the output unit may transmit the identified power transmission level of a power transmitter to a terminal of a user of the movable object together with a position of the power transmitter, whereby the terminal may display the power transmission level and the position of the power transmitter. By presenting the power transmission level and position of the power transmitter to the user in this way, it is possible to guide the user to a power transmitter identified to be convenient for the user.

The present disclosure has been described above in detail on the basis of the embodiments thereof. However, the present disclosure is not limited to the above-described embodiments. Various modifications can be made without departing from the spirit and scope of the present disclosure.

In the above embodiment, the management system also has a function of transmitting information on the power transmitter to the user terminal, but this transmission function is not indispensable. Therefore, the function of guiding the user to a specific power transmitter is also not indispensable.

In the above-described embodiment, the management system provides the processing result to the user terminal, but the management system may provide the processing result to a device other than the user terminal (for example, a power receiver, an information processor outside the management system, and the like).

In each of the above embodiments, the management system includes a database, but an arrangement method of the database is not limited thereto. For example, this database may be in another information processing system different from the management system, or the database may be constructed in the server. A position of the database is not limited at all as long as a device in the management system can access the database via a communication network. The database is not an essential component.

INDUSTRIAL APPLICABILITY

According to one aspect of the present disclosure, a mode of power transmission by the power transmitter can be provided in more detail before the start of power feeding.

REFERENCE SIGNS LIST 1, 1A Management system
10, 10A Server
11 Management unit
12 Reception unit
13 Identification unit
14 Output unit
20 Terminal
30, 30A Database
90 Wireless power transfer system
91, 91A Power transmitter
92 Power receiver
911 Reception unit
912, 912A Detection unit
913 Storage unit
914 Identification unit
915 Output unit
P Management program
P10 Main module
P11 Reception module
P12 Detection module
P13 Storage module
P14 Identification module
P15 Output module
P16 Management module
V Movable object

The invention claimed is:

1. A management system for a power transmitter capable of wirelessly transmitting power to a power receiver of a movable object, the management system comprising:
 a detection unit configured to be coupled to the power transmitter to detect a temperature in the power transmitter;
 a storage unit configured to store an identification rule indicating a relationship between power transmitter temperature, and power transmission level, where power transmission level includes:
  a limit value of an allowable range of power transmitter temperature in which power transmission is possible and how much power can be transmitted when the power transmission is possible,
  an unavailable level indicating that power transmission is impossible,
  a limitation level indicating that power transmission is possible under a predetermined limitation, and
  a normal level indicating that power transmission is possible without limitation;
 an identification unit coupled to the detection unit and the storage unit that is configured to access to the storage unit to identify a power transmission level corresponding to the temperature detected by the detection unit; and
 an output unit configured to output the power transmission level identified by the identification unit before the power transmitter starts transmitting power,
 wherein the identification unit is further configured to identify that the power transmission level is the limitation level if the temperature detected by the detection unit exceeds the allowable range during charging a battery of the movable object.

2. The management system according to claim 1, wherein the output unit is further configured to transmit the identified power transmission level of the power transmitter to a terminal of a user of the movable object together with a position of the power transmitter, whereby the terminal displays the power transmission level and the position of the power transmitter.

3. The management system according to claim 1 further comprising the power transmitter.

4. The management system according to claim 1,
 wherein the detection unit is configured to be coupled to a plurality of power transmitters to detect respective temperatures in the power transmitters,
 wherein a server is configured to communicate with the detection unit to receive respective temperatures of the power transmitters, and
 wherein the server includes the identification unit and the output unit and is configured to identify a power transmission level for each of the power transmitters.

5. The management system according to claim 4, wherein the output unit is further configured to output information of a first power transmitter identified to be at the normal level in preference to information of a second power transmitter identified to be at the limitation level.

6. The management system according to claim 4, further comprising:
 a database configured to store an operation history of the power transmitters,
 wherein the output unit is further configured to compare an operation frequency obtained from the operation history stored in the database of two or more of the power transmitters when the two or more of the power transmitters having the same power transmission level are present and output information of a first power transmitter with a lower or lowest operation frequency among the two or more of the power transmitters in preference to information of the remaining power transmitters among the two or more of the power transmitters.

7. The management system according to claim 2, wherein the identification unit is further configured to calculate a time required for charging the battery based on a charging request related to charging of the movable object and received from the terminal, determine whether or not the temperature in the power transmitter will exceed the allowable range during the charging based on the required time, the detected temperature and the identification rule, and identify that the power transmission level is the limitation level if the detected temperature exceeds the allowable range during the charging.

8. The management system according to claim 1, wherein the identification unit is further configured to identify that the power transmission level is the unavailable level if the detected temperature exceeds the allowable range, and identify that that the power transmission level is the normal level if the detected temperature does not exceed the allowable range during the charging.

9. The management system according to claim 1, wherein the relationship between the temperature in the power transmitter and a power transmission level includes a relationship between a rise in the temperature in the power transmitter and an operation of the power transmitter.

10. A management method to be executed by a management system for a power transmitter capable of wirelessly transmitting power to a power receiver of a movable object, the management method comprising:
- a detection step of detecting a temperature in the power transmitter;
- storing in a storage unit an identification rule indicating a relationship between power transmitter temperature, and power transmission level, where power transmission level includes:
  - a limit value of an allowable range of power transmitter temperature in which power transmission is possible and how much power can be transmitted when the power transmission is possible,
  - an unavailable level indicating that power transmission is impossible,
  - a limitation level indicating that power transmission is possible under a predetermined limitation, and
  - a normal level indicating that power transmission is possible without limitation;
- an identification step of identifying a power transmission level corresponding to the temperature detected in the detection step; and
- an output step of outputting the identified power transmission level in the identification step before the power transmitter starts transmitting power,
- wherein the identification step includes identifying that the power transmission level is the limitation level if the temperature detected by the detection unit exceeds the allowable range during charging a battery of the movable object.

11. The method according to claim 10, wherein the output step includes transmitting the identified power transmission level of the power transmitter to a terminal of a user of the movable object together with a position of the power transmitter, whereby the terminal displays the power transmission level and the position of the power transmitter.

12. A non-transitory computer-readable recording medium storing a management program for causing a computer system including one or more computers to function as a management system for a power transmitter capable of wirelessly transmitting power to a power receiver of a movable object,
wherein the management program causes the computer system to function as:
- a detection unit configured to be coupled to the power transmitter to detect a temperature in the power transmitter;
- a storage unit configured to store an identification rule indicating a relationship between power transmitter temperature, and power transmission level, where power transmission level includes:
  - a limit value of an allowable range of power transmitter temperature in which power transmission is possible and how much power can be transmitted when the power transmission is possible,
  - an unavailable level indicating that power transmission is impossible,
  - a limitation level indicating that power transmission is possible under a predetermined limitation, and
  - a normal level indicating that power transmission is possible without limitation;
- an identification unit coupled to the detection unit and the storage unit that is configured to access to the storage unit to identify a power transmission level corresponding to the temperature detected by the detection unit; and
- an output unit configured to output the power transmission level identified by the identification unit before the power transmitter starts transmitting power,
- wherein the identification unit is further configured to identify that the power transmission level is the limitation level if the temperature detected by the detection unit exceeds the allowable range during charging a battery of the movable object.

13. The non-transitory computer-readable recording medium of claim 12 wherein the management program causes the computer system to function such that the output unit is further configured to transmit the identified power transmission level of the power transmitter to a terminal of a user of the movable object together with a position of the power transmitter, whereby the terminal displays the power transmission level and the position of the power transmitter.

14. The management system according to claim 13, wherein the operation of the power transmitter includes one selected from a power transmission time of the power transmitter and an amount of supplied power from the power transmitter.

* * * * *